United States Patent [19]

Cohen et al.

[11] 4,305,697
[45] Dec. 15, 1981

[54] METHOD AND REPLACEMENT MEMBER FOR REPAIRING A GAS TURBINE ENGINE VANE ASSEMBLY

[75] Inventors: Joel H. Cohen, Cincinnati; Henry E. Lynch, Middletown, both of Ohio

[73] Assignee: General Electric Company, Cincinnati, Ohio

[21] Appl. No.: 131,607

[22] Filed: Mar. 19, 1980

[51] Int. Cl.³ .............................. F01D 9/02; B23P 6/00
[52] U.S. Cl. ............................... 415/217; 29/156.8 H; 29/402.13
[58] Field of Search ............... 415/216, 217, 218, 191, 415/9, 200; 29/156.8 B, 156.8 H, 402.08, 402.13; 228/119

[56] References Cited

U.S. PATENT DOCUMENTS

| 3,275,295 | 9/1966 | Caldwell et al. | 416/224 |
| 3,394,918 | 7/1968 | Wiseman | 416/241 R |
| 3,574,924 | 4/1971 | Dibble | 416/224 X |
| 3,650,635 | 3/1972 | Wachtell et al. | 415/216 X |
| 3,797,085 | 3/1974 | Aartman | 415/216 X |
| 3,802,046 | 4/1974 | Wachtell et al. | 415/216 X |
| 4,214,355 | 7/1980 | Zelahy | 29/156.8 B |

OTHER PUBLICATIONS

Technical Report AFML TR-73-166-Jul. 1973, Metals Branch, Manufacturing Tech. Div., AFML, Air Force Systems Command, USAF, Wright-Patterson Air Force Base, Ohio 45433.

Primary Examiner—Leonard E. Smith
Attorney, Agent, or Firm—Lee H. Sachs; Derek P. Lawrence

[57] ABSTRACT

A gas turbine engine air cooled vane assembly which includes inner and outer platform members and an airfoil member therebetween is repaired by removing from the vane assembly a vane assembly segment comprising at least a portion of the leading edge wall, a portion of the airfoil body wall and a portion of at least one platform member connected with the leading edge wall. The vane assembly segment is removed along a preselected path which, during operation of the vane assembly in a gas turbine engine, experiences relatively low mechanical stresses. A replacement member of substantially the same type of material and of a size and shape which matches the removed vane assembly segment is placed into registry with the vane assembly and then metallurgically bonded to the vane assembly.

6 Claims, 4 Drawing Figures

METHOD AND REPLACEMENT MEMBER FOR REPAIRING A GAS TURBINE ENGINE VANE ASSEMBLY

CROSS-REFERENCE TO RELATED APPLICATIONS

This application is related to application Ser. No. 131,606, Zelahy et al, for "Method and Replacement Member for Repairing a Gas Turbine Engine Blade Member" filed concurrently herewith.

BACKGROUND OF THE INVENTION

1. Field of the Invention

This invention relates to gas turbine engine air cooled vane assemblies and, more particularly, to an improved method and replacement member for repairing such an assembly in the area of its leading edge.

2. Description of Prior Art

Vane assemblies used in the turbine section of gas turbine engines experience strenuous operating conditions including a combination of mechanical stresses and thermal stresses. Accordingly, such vane assemblies have been designed to be air cooled. A variety of such vane assemblies have been described in the art, one example of which is U.S. Pat. No. 3,628,880-Smuland et al patented Dec. 21, 1971 and assigned to the assignee of the present invention. These types of vane assemblies include a hollow interior portion enclosed by walls, some of which include openings to allow cooling air to exit from within the hollow interior of the vane assembly.

As can be appreciated, such vane assemblies are complex in design and are relatively costly to manufacture. Therefore, it is desirable to repair rather than to replace such vane assemblies which may have been worn or damaged during gas turbine engine operation. It has been recognized that a substantial portion of such wear or damage occurs at the leading edge wall and sometimes adjacent body portions of the airfoil of the vane assembly. Although repair of such vane portions have been made by fusion welding, such repair method has limitations because of distortion due to welding. In addition, recracking of the repair welds has been experienced in some instances.

SUMMARY OF THE INVENTION

It is a principal object of the present invention to provide an improved method for repairing a gas turbine engine air cooled vane assembly which does not employ fusion welding.

Another object is to provide such an improved method in which a segment of the vane assembly is removed along a substantially non-critical path which defines both locating and bonding surfaces and replaced with a matching member.

Still another object is to provide an improved vane assembly replacement member for repair of an air cooled vane assembly.

These and other objects and advantages will be more fully understood from the following detailed description of the preferred embodiments and the drawing all of which are intended to be typical of rather than in any way limiting on the scope of the present invention.

Briefly, one form of the method associated with the present invention relates to the repair of a gas turbine engine air cooled vane assembly which includes inner and outer spaced apart structural platform members and an airfoil member disposed therebetween. The airfoil member has a leading edge wall, a trailing edge portion and a body wall therebetween together defining a hollow interior of the airfoil member. In the practice of the method, there is first removed from the vane assembly a vane assembly segment which comprises at least a portion of the leading edge wall, a portion of the airfoil body wall connected with the leading edge wall and a portion of at least one structural platform member connected with the leading edge wall. The vane assembly segment thus removed provides a first locating and bonding wall surface on the vane assembly along a preselected path which, during operation of the vane assembly in a gas turbine engine, experiences relatively low mechanical stresses. There is provided for use in such a repair method a replacement member of substantially the same type of material and of a size and shape which matches the removed vane assembly segment. Such replacement member includes a second locating and bonding wall surface which matches the first locating and bonding wall surface on the vane assembly. The first and second locating and bonding wall surfaces are placed into registry and then are metallurgically bonded at such wall surfaces through a non-fusion method.

DESCRIPTION OF THE PREFERRED EMBODIMENTS

Figure 1:
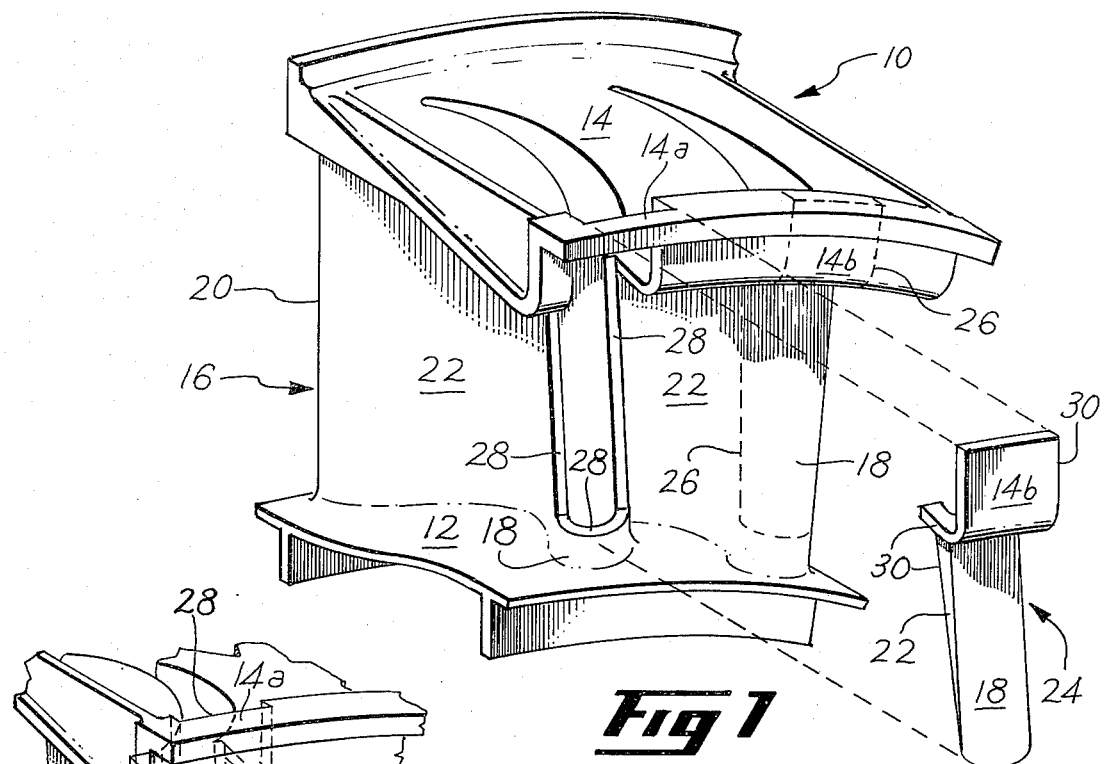
FIG. 1 is a fragmentary perspective view of a portion of a gas turbine engine turbine vane assembly including an exploded view of a replacement member.

In the following description and in the drawing, like reference numerals will be used to identify like parts. With particular reference to the perspective, partially sectional, exploded view of FIG. 1, a portion of a gas turbine engine air cooled vane assembly is shown generally at 10. Such assembly includes an inner platform member 12 in spaced apart relationship with an outer platform 14, with airfoil member shown generally at 16 secured therebetween. Airfoil member 16 includes a leading edge wall 18, a trailing edge portion 20 and a body wall 22. Together, the leading edge wall, the body portion and the trailing edge portion define a hollow interior of the airfoil member. Generally, cooling fluid openings are provided in walls of the airfoil member, for example, as shown in the above-identified U.S. Pat. No. 3,628,880—Smuland et al, the disclosure of which is incorporated herein by reference. However, such openings are not described here for simplicity of presentation and because they form no part of the present invention.

As was mentioned before, during operation of such a vane assembly in a gas turbine engine, wear, damage or other distress to the airfoil leading edge wall 18 can occur. According to the method of the present invention, a vane assembly segment of the size and shape of member 24 is removed from the vane assembly along a preselected path 26, shown in phantom in FIG. 1 and which, during operation of the vane assembly in a gas turbine engine, has been recognized to experience relatively low mechanical stresses. For example, during operation, a relatively large bending force is impressed on airfoil 16 generally on the airfoil body wall towards the trailing edge 20 and inner platform 12. This generates a relatively high mechanical stress area toward the leading edge wall 18 approaching outer platform 14. It has been recognized further that an area of relatively low stress lies at the leading edge wall approaching but away from the inner platform 12. Thus, for the embodiment of the vane assembly shown in FIG. 1, the preselected path experiencing relatively low mechanical stresses is that shown in phantom at 26. Removal of the portion enclosed by path 26 provides a first locating and bonding wall surface 28.

According to the present invention, there is provided replacement member 24 of substantially the same type of material, and of a size and shape which matches the removed vane assembly segment enclosed by the preselected path 26. Replacement member 24 includes a second locating and bonding wall surface 30 which matches the first locating and bonding wall surface 28 to enable close registry of replacement member 24 with vane assembly 10. Conveniently, replacement member 24 can be precision cast in a conventional manner, for example, using the "lost-wax" type method generally used in the manufacture of the vane assembly.

Another feature of the method of the present invention as it relates to the preselected path 26 and the extent of replacement member 24 is the fact that preselected path 26, and hence the size and shape of replacement member 24, extends at least into one platform member, such as 14 in FIG. 1. This is necessary to resolve gas stream loading on the airfoil portion into the mounting structure. This insurance of good load transfer is particularly significant when repairing the first of a pair of vanes in a vane segment, for example, the left vane shown in FIG. 1. Thus, an important feature of the present invention is the provision of a replacement member which includes a replacement for a portion of the airfoil, to be bonded along relatively low mechanical stress lines, and a portion which transfers loads from such bonded airfoil replacement portion to a connected structural member outside of the airfoil member.

Figure 2:
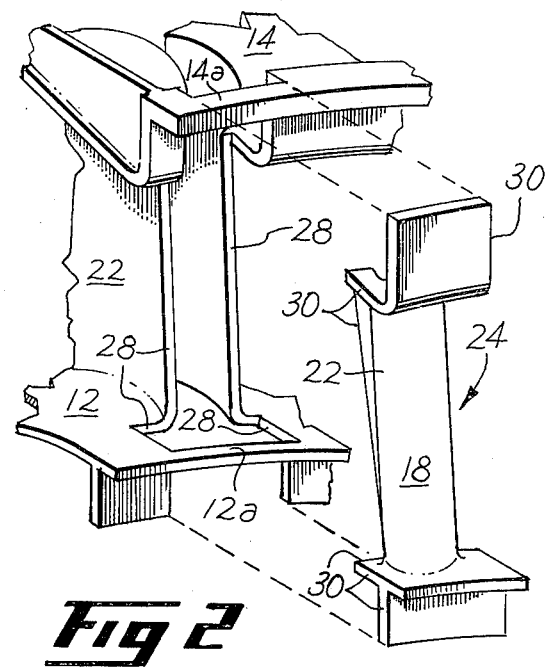
FIG. 2 is a fragmentary perspective view of the type of vane assembly shown in FIG. 1 with another embodiment of the replacement member in an exploded view.

Another embodiment of the present invention is shown in the fragmentary, perspective, exploded view of FIG. 2. In such embodiment, the entire leading edge of the airfoil is replaced. In addition, portions of both structural platforms have been removed and have been included in the replacement member. It should be noted that removed portions of the platform, such as 14 in FIG. 1, and 12 and 14 in FIG. 2, do not extend completely through the forward edge portions of the platform, such as on rail 14a in FIG. 1, and 12a and 14a in FIG. 2. This is preferred in order to maintain the integrity of such structures and, particularly in the case of rail 14a, to avoid replacement of a structural member portion having particularly significant tolerance limitations.

Figure 3:
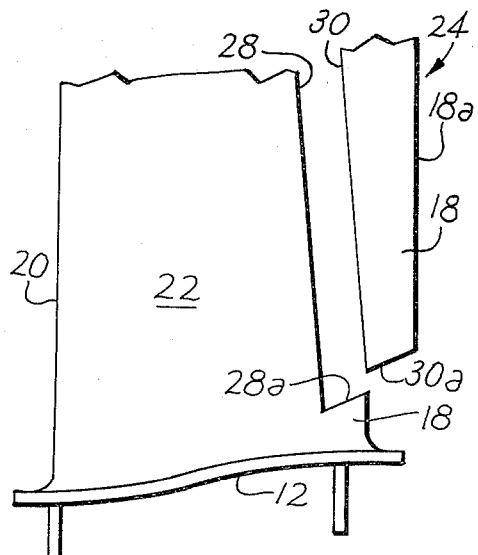
FIG. 3 is a fragmentary view of an airfoil and an inner platform portion of the vane assembly in another embodiment of the replacement member.

Still another embodiment of the present invention is shown in FIG. 3. Such embodiment involves the preselection of the path 26 to provide a replacement member having a leading edge wall portion tip 30a, as a portion of the locating and bonding wall surface, inclined or tapered toward the body wall 22, away from the foremost leading edge 18a and toward the adjacent platform member 12a. Thus, tip 30a is tapered toward trailing edge 20 and away from platform member portion 14b of the replacement member as shown in FIG. 1. Such an arrangement locks the leading edge portion of the replacement member to the leading edge portion remaining in the vane assembly airfoil member. This further transfers from the airfoil member to the remaining, unremoved vane assembly, through its remaining airfoil portion, loads on the replacement member which would tend to rotate the replacement member away from the airfoil around a center located in outer platform 14. Thus, in the embodiment represented by FIG. 3, the replacement member not only transfers load to the outer structural platform member 14, but also is configured to transfer any additional bending or rotating loads to the remaining vane assembly at the portion of the replacement member away from the platform. This type of structure, of course, is not included in the embodiment of FIG. 2 because loads are transferred from the airfoil to each of the structural platform members 12 and 14.

Figure 4:
FIG. 4 is a fragmentary view of still another embodiment associated with the present invention.

A further embodiment of the present invention is shown in the fragmentary view of FIG. 4 in which portion 14b of outer platform 14 is not completely removed as in FIG. 1, but is only partially removed. Thus, there is provided a substantial face portion on platform 14 adjacent rail 14a for locating and bonding at that portion of outer platform 14. As has been described above, the replacement member for the embodiment of FIG. 4 will be of a size and shape which matches the removed portion of the vane assembly, including that part of portion 14b which defines a portion of locating and bonding wall 28.

Used in one evaluation of the present invention was a vane assembly configuration currently used in a commercial gas turbine engine. Such assembly was made of a nickel base superalloy sometimes referred to as Rene' 80 alloy and more fully described in U.S. Pat. No. 3,615,376—Ross, assigned to the assignee of the present invention. Also used in the evaluation was a nickel base bonding powder more particularly described in U.S. Pat. No. 3,759,692—Zelahy, assigned to the assignee of the present invention. The disclosures of each of these patents is incorporated herein by reference.

First, a portion of the leading edge wall and the outer platform was removed along a preselected path 26 as shown in FIG. 1 by electrodischarge machining, commonly used in the material removal art. Because the vane assembly being evaluated had been operated in a gas turbine engine, the remaining vane assembly was then cleaned by removing surface contamination and coatings such as were applied for oxidation and sulfidation resistance. Although such removal can be accomplished in a variety of known methods, this evaluation included use of a method described in U.S. Pat. No. 4,098,450—Keller et al, patented July 4, 1978 and assigned to the assignee of the present invention. The disclosure of such patent is incorporated herein by reference. Such method includes contact of the surface with gaseous active fluoride ions to remove oxides.

Because such path was preselected, there was provided by precision casting using the "lost-wax" process a replacement member of the above-described Rene' 80 alloy and of a configuration which matched that of the segment removed from the vane assembly. The replacement member was placed in registry with the vane assembly at the surfaces from which material had been removed, across a relatively narrow and controlled crevice or gap. Thereafter, the replacement member was bonded to the vane assembly using a mixture of the above-described nickel base bonding powder and a powder of the above-described Rene' 80 alloy, in a vacuum brazing method. The result was a repaired vane assembly having a securely metallurgically bonded replacement member at its leading edge portion and with at least one of its structural platform members.

As was mentioned before, bonding of the replacement member to the balance of the vane assembly is by a non-fusion process such as is accomplished in vacuum brazing, eutectic brazing, hot isostatic pressing and diffusion bonding-type operations. It has been recognized that fusion-type joining, such as fusion welding, can result in the creation of additional stresses in the vicinity of the juncture between the replacement member and the vane assembly, ultimately to result in cracking as well as distortion. Therefore, as used herein, the term "metallurgical bonding" is intended to exclude from its meaning fusion-type joining processes.

Although the present invention has been described in connection with specific examples and embodiments, it will be recognized by those skilled in the art that various modifications and variations are possible within the scope of the present invention which is intended to be encompassed by the appended claims.

What is claimed is:

1. In a method for repairing a gas turbine engine air cooled vane assembly which includes inner and outer spaced apart structural platform members and an airfoil member disposed therebetween, the airfoil member having a leading edge wall, a trailing edge portion and a body wall therebetween together defining a hollow interior of the airfoil member, the steps of:

removing from the vane assembly a vane assembly segment comprising at least a portion of the leading edge wall, a portion of the airfoil body wall connected with said leading edge wall portion, and a portion of at least one structural platform member connected with said leading edge wall portion;

the vane assembly segment being removed to provide a first locating and bonding wall surface on the vane assembly along a preselected path which, during operation of the airfoil member in a gas turbine engine, experiences relatively low mechanical stresses;

providing a replacement member of substantially the same type of material and of a size and shape which matches the removed vane assembly segment, the replacement member including a second locating and bonding wall surface which matches the first locating and bonding wall surface;

placing the first and second locating and bonding wall surfaces into registry one with the other; and then, metallurgically bonding the replacement member with the vane assembly at the locating and bonding wall surfaces.

2. The method of claim 1 in which:

the vane segment removed from the vane assembly comprises: a first leading edge wall portion which is less than the entire leading edge wall disposed between the inner and outer platform members thereby retaining a second leading edge wall portion on the vane assembly; a portion of the airfoil body wall connected with the first leading edge wall portion; and a portion of a first of the structural platform members connected with the first leading edge wall portion;

a portion of the preselected path is disposed between the first leading edge wall portion and the second leading edge wall portion and is inclined toward the trailing edge portion and toward a second of the structural platform members; and the replacement member provided is of the same size and shape as the removed vane segment whereby the replacement member leading edge wall portion is locked with the second leading edge wall portion retained on the vane assembly.

3. The method of claim 1 in which the vane assembly segment comprises portions of both inner and outer structural platform members, the entire leading edge wall therebetween, and a portion of the airfoil wall connected with the leading edge wall.

4. A precision cast replacement member for a segment of a gas turbine engine air cooled vane assembly, the vane assembly including inner and outer spaced apart structural platform members and an airfoil member disposed therebetween, the airfoil member having a leading edge wall, a trailing edge portion and a body wall therebetween, together defining a hollow interior of the airfoil member, the replacement member comprising:

at least a portion of the leading edge wall;

a portion of the airfoil body wall connected with said leading edge wall portion; and a portion of at least one structural platform member connected with said leading edge wall portion.

5. The precision cast replacement member of claim 4 consisting essentially of:

a portion of one of the structural platform members;

the leading edge wall portion being less than the entire leading edge wall disposed between the inner and outer platform members and including a leading edge wall portion tip remote from the portion of the structural platform member and inclined from the leading edge wall portion toward the portion of the airfoil body wall and away from the portion of the structural platform member.

6. The precision cast replacement member of claim 4 which includes portions of both inner and outer structural platform members and the complete leading edge wall therebetween.

* * * * *